United States Patent
Suga et al.

(10) Patent No.: US 7,946,364 B2
(45) Date of Patent: May 24, 2011

(54) LEGGED ROBOT

(75) Inventors: Keisuke Suga, Aichi-ken (JP); Akira Ogawa, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 313 days.

(21) Appl. No.: 12/375,551

(22) PCT Filed: Jul. 27, 2007

(86) PCT No.: PCT/JP2007/064775
§ 371 (c)(1),
(2), (4) Date: Mar. 6, 2009

(87) PCT Pub. No.: WO2008/015976
PCT Pub. Date: Feb. 7, 2008

(65) Prior Publication Data
US 2009/0260472 A1    Oct. 22, 2009

(30) Foreign Application Priority Data
Jul. 31, 2006  (JP) ................................ 2006-207471

(51) Int. Cl.
*B25J 19/00*  (2006.01)
(52) U.S. Cl. .............................. 180/8.1; 180/8.2; 180/8.3
(58) Field of Classification Search .................. 180/8.1, 180/8.2, 8.3, 8.5
See application file for complete search history.

(56) References Cited

U.S. PATENT DOCUMENTS

| | | | | |
|---|---|---|---|---|
| 912,108 A | * | 2/1909 | Gaskill | 180/8.6 |
| 1,511,928 A | * | 10/1924 | Zboril | 180/8.7 |
| 3,484,988 A | * | 12/1969 | Robbins | 446/355 |
| 4,629,440 A | * | 12/1986 | McKittrick et al. | 446/356 |
| 4,834,200 A | * | 5/1989 | Kajita | 180/8.1 |

(Continued)

FOREIGN PATENT DOCUMENTS

DE    100 32 640 A1    1/2002

(Continued)

OTHER PUBLICATIONS

Chinese office Action of Application No. 2007800023552 mailed Dec. 4, 2009 and English translation thereof.

(Continued)

*Primary Examiner* — Joanne Silbermann
*Assistant Examiner* — Michael R Stabley
(74) *Attorney, Agent, or Firm* — Kenyon & Kenyon LLP

(57) ABSTRACT

A legged robot is provided whose trunk link is not prone to wobble in the front-back direction during walking. The legged robot is equipped with a trunk link and a pair of legs. Each leg has a pitch joint capable of rotating the connected links in a plane that intersects with a line extending in a lateral direction of the robot. Rotation centers of the pitch joints are located above a center of gravity of the trunk link. The legged robot walks mainly by swinging the legs backward and forward around such rotation centers. Hence, the trunk link wobbles mainly in the front-back direction around the rotation centers as the robot walks. Because the center of gravity of the trunk link is located below the rotation centers, the gravitational force acting on the trunk link acts in a direction to suppress swinging of the trunk link during walking. Due to this, the trunk link of the legged robot is not prone to wobble in the front-back direction during walking.

6 Claims, 6 Drawing Sheets

U.S. PATENT DOCUMENTS

| | | | |
|---|---|---|---|
| 5,151,859 A * | 9/1992 | Yoshino et al. | 701/23 |
| 5,159,988 A * | 11/1992 | Gomi et al. | 180/8.6 |
| 5,343,397 A * | 8/1994 | Yoshino et al. | 701/23 |
| 5,455,497 A * | 10/1995 | Hirose et al. | 318/568.12 |
| 6,089,950 A * | 7/2000 | Lee et al. | 446/376 |
| 6,238,264 B1 * | 5/2001 | Kazami et al. | 446/356 |
| 6,243,623 B1 * | 6/2001 | Takenaka et al. | 700/245 |
| 6,462,498 B1 * | 10/2002 | Filo | 318/568.12 |
| 6,505,096 B2 * | 1/2003 | Takenaka et al. | 700/245 |
| 6,564,888 B1 * | 5/2003 | Gomi et al. | 180/8.6 |
| 6,580,969 B1 * | 6/2003 | Ishida et al. | 700/245 |
| 6,583,595 B1 * | 6/2003 | Hattori et al. | 318/567 |
| 6,897,631 B2 * | 5/2005 | Miyazaki et al. | 318/568.12 |
| 6,917,175 B2 * | 7/2005 | Hattori et al. | 318/567 |
| 6,981,562 B2 * | 1/2006 | Takahashi | 180/8.6 |
| 6,992,457 B2 * | 1/2006 | Furuta et al. | 318/568.12 |
| 7,053,577 B2 * | 5/2006 | Nagasaka | 318/568.12 |
| 7,240,747 B2 * | 7/2007 | Miyazaki et al. | 180/8.6 |
| 7,289,884 B1 * | 10/2007 | Takahashi et al. | 700/245 |
| 2002/0022907 A1 * | 2/2002 | Takenaka et al. | 700/245 |
| 2009/0009124 A1 | 1/2009 | Suga et al. | |

FOREIGN PATENT DOCUMENTS

| | | |
|---|---|---|
| JP | 61-143266 A | 12/1986 |
| JP | 62-149568 A | 7/1987 |
| JP | 7-256579 A | 10/1995 |
| JP | 11-500331 A | 1/1999 |
| JP | 2000-355290 A | 12/2000 |
| JP | 2002-160182 A | 6/2002 |
| JP | 2003-80476 A | 3/2003 |
| JP | 2003-266339 A | 9/2003 |
| JP | 2004-105553 A | 4/2004 |
| JP | 2005-052897 * | 3/2005 |
| JP | 2005-52897 A | 3/2005 |
| JP | 2005-161441 * | 6/2005 |
| JP | 2005-161441 A | 6/2005 |
| JP | 2005-186650 A | 7/2005 |
| JP | 2005-297087 * | 10/2005 |
| JP | 2005-297087 A | 10/2005 |
| JP | 2007-185734 * | 7/2007 |
| JP | 2007-185734 A | 7/2007 |
| JP | 2007-229872 A | 9/2007 |

OTHER PUBLICATIONS

Extended European Search Report dated Jul. 30, 2010 of EP Application No. 10005405.5-2316.

Japanese Office Action of Application No. 2006/207471 mailed Apr. 13, 2010 and English translation thereof.

Office Action issued on Oct. 1, 2010 in U.S. Appl. No. 12/280,361.

* cited by examiner

LEGGED ROBOT

This is a 371 national phase application of PCT/JP2007/064775 filed 27 Jul. 2007, which claims priority of Japanese Patent Application No. 2006-207471 filed 31 Jul. 2006, the contents of which are incorporated herein by reference.

CROSS-REFERENCE TO RELATED APPLICATION

This application claims priority to Japanese Patent Application No. 2006-207471, filed on Jul. 31, 2006, the contents of which are hereby incorporated by reference into the present application.

BACKGROUND OF THE INVENTION

1. Field of the Invention

The present invention relates to a legged robot having a trunk link and a pair of legs connected to the trunk link. The legged robot is sometimes termed simply "robot" herein.

2. Description of the Related Art

Legged robots having a pair of legs connected to a trunk link are being developed. Each leg has a plurality of links. Furthermore, a plurality of joints is disposed in each leg. Each joint connects at least two links, and rotates the connected links relative to each other by using the power that is supplied thereto. In some cases, the links connected by the joints are links composing a leg, while in other cases, they consist of the trunk link and a link composing a leg. The joint that connects the trunk link and the link composing a leg is termed a "hip joint". Herein, a joint that rotates the connected links relative to each other with one degree of freedom is represented as one single joint, while a joint that rotates the connected links relative to each other with two degrees of freedom is represented as two independent joints.

A legged robot walks by alternately swinging each of its pair of legs along forward and backward direction with respect to the trunk link, via appropriate control of the power that relatively rotates the links that are connected by the joint. The motion of the leg swinging forward and backward is mainly realized by the motion of a joint that rotates the connected links in a plane that crosses a line extending in the lateral direction of the robot and that has its rotation center located at position that is most distant from the floor (that is, in the highest position).

Other than a rotary joint having a physical rotation shaft, the joint that rotates links relatively with respect to each other may be realized as a sliding joint having the following configuration. The sliding joint has a rail that extends along an arc with an imaginary rotation axis as its center, and a sliding member that moves on such rail. The sliding joint has no physical rotation shaft, but has a rotation axis that serves as the center of rotation. As used herein, the "rotation axis" of a joint signifies the central axis of rotation, and is not restricted to a form of a physical shaft. Also, the "rotation center" is the central point, in a plane defined by links rotating relatively to each other, of the relative rotation of such links. In other words, the rotation center means the cross point of the rotation axis and the plane formed by the relatively rotating links.

A joint that rotates connected links in a plane that crosses a line extending in the lateral direction of the robot is termed a "pitch joint" herein. Expressed differently, a pitch joint is a joint that rotates connected links around a rotation axis extending in the lateral direction of the robot. Also, the pitch joint whose rotation center is located in the position highest from the floor is termed the "uppermost pitch joint".

Japanese Patent Application Publication No. 2005-186650 (Patent Document 1) discloses a legged robot having a pair of legs. This legged robot is provided with a cabin in which a person rides, and a pair of leg links. The top ends of the leg links are connected to the bottom of the cabin by means of pitch joints. More precisely, with this legged robot, the uppermost pitch joint is disposed at the top end of each leg, beneath the cabin. The cabin in Patent Document 1 corresponds to the trunk link herein, and the leg links correspond to the legs herein.

BRIEF SUMMARY OF THE INVENTION

When a legged robot walks, the trunk link itself wobbles backward and forward. In some cases the trunk link wobbles due to reactive force from the legs, and in other cases it wobbles by design, in response to control for maintaining the overall balance of the robot.

In the legged robot of Patent Document 1, the trunk link is located over the uppermost pitch joint. More precisely, the center of gravity of the trunk link is located above the rotation center of the uppermost pitch joint. With the center of gravity of the trunk link located above the rotation center of the uppermost pitch joint, when the trunk link wobbles around the rotation center of the uppermost pitch joint, gravitational force acts in a direction that enlarges the wobble of the trunk link. This means that the legged robot of Patent Document 1 has a structure in which, when it walks, its trunk link is prone to wobble. It is preferable that wobbling of the trunk link during walking be small. A legged robot whose trunk link is not prone to wobble during walking is desired.

The legged robot of the present invention is provided with a trunk link and a pair of legs that are connected to the trunk link, whereas each of the legs has a plurality of links.

Each leg has a plurality of joints. Each joint connects at least two links. The connected links rotate relative to each other by a power supplied thereto (driving force). At least one joint of each leg can rotate the connected links in the plane that crosses the line extending in the lateral direction of the robot, and has a rotation center located above the center of gravity of the trunk link. As used herein, the expression "has a rotation center located above the center of gravity of the trunk link" means that the rotation center is "located above" the center of gravity during ordinary operation of the legged robot, e.g. when the legged robot is in the standing attitude, walking attitude or the like. The expression "has a rotation center located above the center of gravity of the trunk link" may not necessarily apply to attitudes that are not imaginable in ordinary operation of the legged robot, such as when the legged robot is in a fallen-over attitude or the like.

The foregoing robot is, in other words, equipped with an uppermost pitch joint whose rotation center is located above the center of gravity of the trunk link. Due to the rotation center of the uppermost pitch joint being located above the center of gravity of the trunk link, the gravitational force acting on the trunk link acts in a direction that suppress wobbling of the trunk link around the rotation axis of the uppermost pitch joint. With such configuration, a legged robot whose trunk link is not prone to wobble during walking can be realized.

The foregoing legged robot also yields an advantage of securing a large stride while keeping the position of the trunk link low. The legged robot walks by swinging its legs backward and forward around the rotation centers of the uppermost pitch joints. Hence, with the height from the floor to the rotation centers of the uppermost pitch joints being greater, larger strides can be achieved. With the foregoing legged robot, the rotation center of the uppermost pitch joint can be positioned higher than the center of gravity of the trunk link. This means that it is possible to obtain a large stride while keeping the position of the trunk link low.

The uppermost pitch joint may be a joint that connects leg links, but is preferably a hip joint that connects the trunk link to the link at the top end of the leg. In that case, the connection between the trunk link and the leg of the legged robot can be considered analogous to that between the trunk and leg of a human. Also, an advantage can be obtained that the structure of the legs can be easily simplified.

The hip joint may have or may not have a physical rotation shaft. If they do have a physical rotation shaft, the hip joint may connect the leg at an external lateral side surface of the robot; or alternatively, at an internal lateral side surface thereof. In either case, the interior of the trunk link can be effectively utilized for carrying a load or a rider.

Alternatively, the hip joint may be realized as a joint that do not have a physical rotation shaft. In this case, the hip joint may include: rail that is fixed to the trunk link and extends along an arc whose center is located above the center of gravity of the trunk link when viewed in the lateral direction of the robot; and sliding member that moves on the rails. In other words, the rail curves around the center located above the center of gravity of the trunk link, and moreover, the rail extends in the front-back direction of the robot. Note that, as mentioned earlier, the rotation axis in this case passes through the center (the rotation center) of the arc and is equivalent to a line perpendicular with the plane formed by the rail extending along the arc.

If the hip joint is realized as sliding joint in the foregoing manner, a large stride can be achieved for the legged robot with legs having relatively short overall length. A legged robot that utilizes sliding joint may obtain, with short legs that extend from the floor to the rails but do not extend long enough to the centers of the arcs (the rotation centers), a large stride that may be compared to the stride realized by long legs that extends to the centers of the arcs (the rotation centers).

It is preferable that at least one of the joints whose rotation center is located above the center of gravity of the trunk link has a release mechanism that allows the connected links to rotate passively when a predetermined condition is satisfied. The "joint whose rotation center is located above the center of gravity of the trunk link" refers here to at least one of those joints in each leg that can rotate the connected links in the plane that crosses the line extending in the lateral direction of the robot, and whose rotation center is located above the center of gravity of the trunk link. Also, the expression "rotate passively" means that the links can rotate in response to external force, "external force" being, for example, gravity. In other words, the release mechanism allows free rotation of the connected links. The predetermined condition may be a condition that at least one of the followings exceeds a predetermined range: the attitude angle of the trunk link with respect to the line extending in the lateral direction of the robot; the rate of the aforesaid attitude angle; and the acceleration of the attitude angle. Alternatively, the predetermined condition may be a condition that at least one of the speed of the movement of the trunk link and the acceleration of the movement of the trunk link exceeds a predetermined range. For a legged robot having a pair of legs, such conditions are used for judging whether the robot is falling over. Thus, the release mechanism enables the links connected to the uppermost pitch joint to swing passively (freely) by the action of gravity in cases where it is judged that the robot is falling over. With such release mechanism, an attitude in which the center of gravity of the trunk link is positioned below the rotation center of the uppermost pitch joint can be maintained when the robot is falling over. The trunk link thus does not rotate significantly when the robot is falling over.

The release mechanism may, for example, be a clutch interposed between shafts that transmit power to the joint for rotating the connected links relative to each other. Alternatively, in the case where the power for rotating the connected links relative to each other is transmitted to the joints by means of belts, the release mechanism may be a tension adjuster for the belts. Through releasing the tension by the tension adjuster, transmission of power for rotating connected links relative to each other may be cut off, allowing free rotation of the links.

With the foregoing robot, when the robot is judged to be falling over, the robot can, by the action of gravity and without reliance on the supplied power, bring down the trunk link to the floor while keeping an attitude in which the center of gravity is located below the rotation center of the joint.

The trunk link may have a seat on which a rider sits. The seat is preferably disposed such that the waist of the rider when seated therein is located below the aforementioned cross point.

In general, it is known that in the ordinary seated attitude of a human, the center of gravity of the human is located near the waist. Hence, by disposing the seat in the foregoing configuration, the center of gravity of the seated rider can be located below the rotation center of the uppermost pitch joint. Taken together with the fact that the center of gravity of the trunk link is also located below the rotation center of the uppermost pitch joint, this means that the combined center of gravity of the trunk link and the rider can be located below the rotation center of the uppermost pitch joint. This makes the trunk link more stable when the rider seats thereon. Thus, a legged robot whose trunk link is not prone to wobble even when the robot is walking while carrying a rider can be realized.

With the technology disclosed herein, a legged robot can be provided whose trunk link is not prone to wobble during walking.

BRIEF DESCRIPTION OF THE SYMBOLS

10, 110, 210: LEGGED ROBOT
12, 112, 212: TRUNK LINK
20L, 20R, 220L, 220R: LEG
114: SEAT
114A: SEAT SURFACE
216L, 216R: SLIDING JOINT
240L, 240R: RAIL
241L, 241R: SLIDING MEMBER

DETAILED DESCRIPTION OF THE INVENTION

Several of the technical features of robots according to embodiments of the invention will now be described below.
First Technical Feature:
Rotation center of the uppermost pitch joint and the center of gravity of a trunk link are aligned along a vertical line, as viewed in the lateral direction of the robot, when the legged robot is maintaining an upright attitude. Note that the "upright attitude" refers to an attitude in which the center of gravity of the trunk link, joints corresponding to knees of a human, and joints corresponding to ankles of a human are substantially aligned along the vertical line, as viewed in the lateral direction of the robot. With a robot having such configuration, wobbling of the trunk link during walking can be effectively suppressed.
Second Technical Feature:
Sliding joint is provided at the bottom surface of the trunk link. The sliding joint is disposed such that a roll joint provided in the leg is positioned within the lateral-direction width of the trunk link when the legged robot keeps the upright attitude. The "roll joint" refers to a joint whose rotation axis extends in the front-back direction of the trunk link.
Third Technical Feature:
A seat attached to the trunk link is disposed such that the seat surface is substantially perpendicular to a line connecting the rotation center of the uppermost pitch joint and the center of gravity of the trunk link, viewed in the lateral direction of the robot. The trunk link is in the most stable attitude, with respect to gravity when its center of gravity is positioned vertically below the rotation center of the uppermost pitch joint. In a robot having the foregoing configuration, the seat surface can be kept substantially horizontal during such attitude.

First Embodiment

Figure 1:
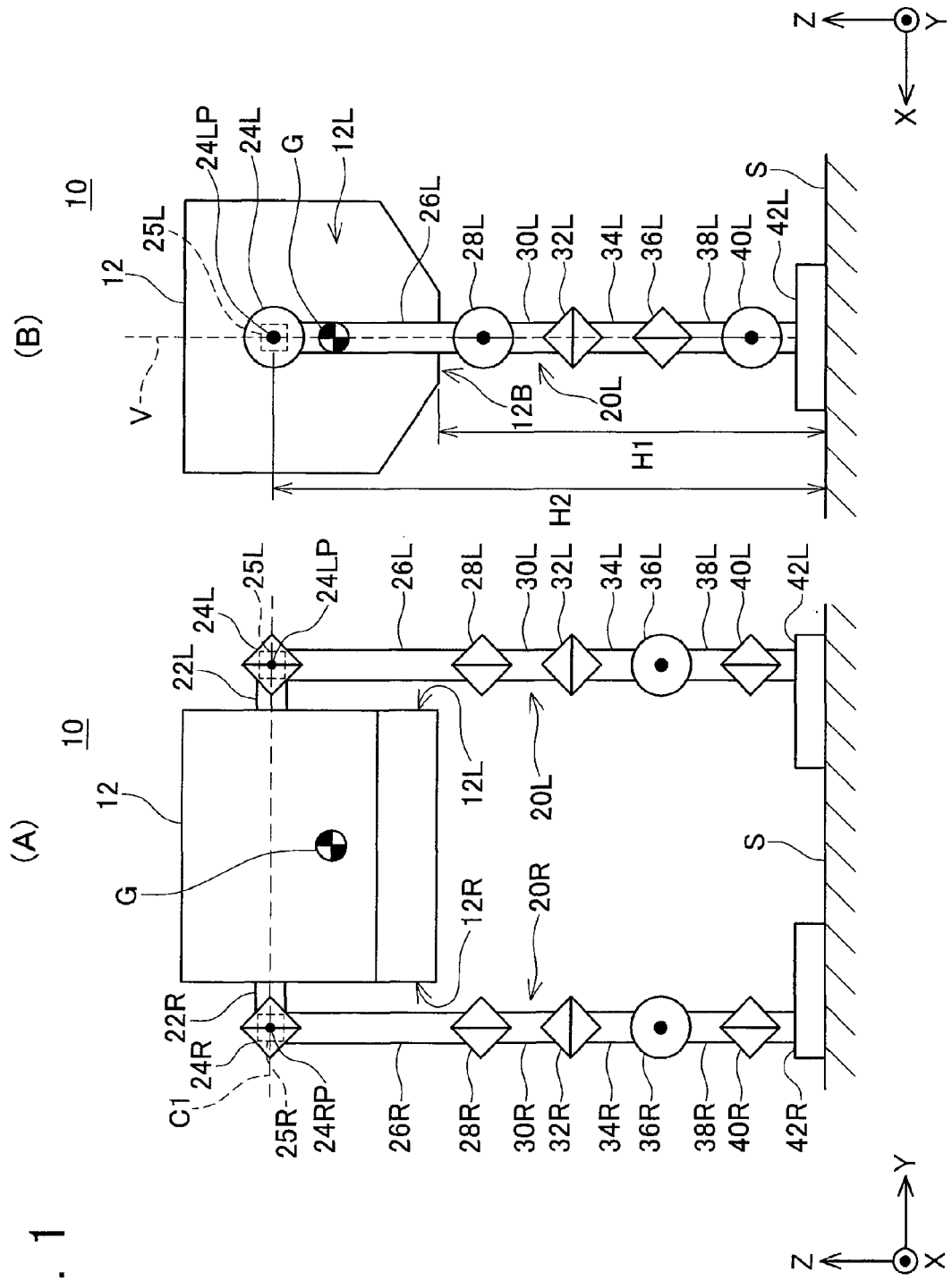
FIG. 1(A) is a front view of a legged robot according to a first embodiment.
FIG. 1(B) is a side view of the legged robot according to the first embodiment.

A legged robot 10 according to a first embodiment of the present invention will now be described, with reference to the accompanying drawings. FIG. 1(A) is a front view of the legged robot 10, and FIG. 1(B) is a side view of the legged robot 10. Note that in FIG. 1(B), indication of those parts that are hidden by the parts in the foreground of the drawing is omitted.

The legged robot 10 has a trunk link 12 and a pair of legs (right leg 20R and left leg 20L). Each leg has a plurality of links and a plurality of joints, as will be described hereafter.

First of all, a coordinate system will be described. In FIGS. 1(A) and 1(B), an XYZ coordinate system constituting a right-handed orthogonal coordinate system is shown. The XYZ coordinate system is a coordinate system that has an origin fixed to the trunk link 12 of the legged robot 10. The X-axis extends forward from the trunk link 12, and is termed a "roll axis". The Y-axis extends in the lateral direction of the trunk link 12 and is termed a "pitch axis". The Z-axis extends upward from the trunk link 12 and is termed a "yaw axis". The roll axis (X-axis), the pitch axis (Y-axis), and the yaw axis (Z-axis) are mutually orthogonal to each other.

Next, the joints are described. The joints of the legged robot 10 are all rotary joints having respective rotation axes. A joint having a rotation axis that extends in the roll axis direction is termed a "roll joint", a joint having a rotation axis that extends in the pitch axis direction is termed a "pitch joint", and a joint having a rotation axis that extends in the yaw axis direction is termed a "yaw joint".

A circle marked with reference numeral e.g. 36L shown in FIG. 1(A) indicates a joint having a rotation axis in a direction perpendicular to the plane of the drawing. A dot drawn in the center of the circle represents the rotation axis. In FIG. 1(A), the direction perpendicular to the plane of the drawing is the roll axis (X-axis) direction. Therefore, the joints expressed as circles, such as the joint indicated by reference numeral 36L, represent roll joints. Rectangles marked with reference numerals e.g. 24L and 32L in FIG. 1(A) indicate joints having respective rotation axes in a plane parallel to the plane of the drawing. The rotation axis of each of such joints runs in a direction that is parallel to the plane of the drawing and orthogonal to the line drawn inside the rectangle. For instance, the joint marked with reference numeral 24L in FIG. 1(A) represents a joint having a rotation axis C1 in the pitch axis (Y-axis) direction. That is, the joint marked with reference numeral 24L in FIG. 1(A) represents a pitch joint. As another example, the joint marked with reference numeral 32L in FIG. 1(A) represents a joint having a rotation axis in the yaw axis (Z-axis) direction. That is, the joint marked with reference numeral 32L in FIG. 1(A) represents a yaw joint.

The roll joint marked with reference numeral 36L is represented by a circle in FIG. 1(A), while in FIG. 1(B) is represented by a rectangle having a diagonal line extending in the up-down direction of the plane of the drawing. This is because the orientation of the coordinate system with respect to the plane of the drawing differs in FIG. 1(A) and FIG. 1(B). Likewise, the pitch joint marked with reference numeral 24L is represented, in FIG. 1(A), by a rectangle with a diagonal in the up-down direction of the plane of the drawing, while in FIG. 1(B), is represented by a circle. The yaw joint marked with reference numeral 32L is represented, in both FIG. 1(A) and FIG. 1(B), by a rectangle with a diagonal in the left-right direction of the plane of the drawing. The significations of the forms with which the joints are depicted are the same in the drawings for the first embodiment and the second embodiment.

The type (i.e. roll joint, pitch joint, or yaw joint) of each joint possessed by the legs 20L, 20R is determined by the direction of the rotation axis of the joint when the legged robot 10 is maintaining the upright attitude. The "upright attitude" refers to the attitude shown in FIGS. 1(A) and 1(B), in which the pair of legs 20L, 20R maintain the same attitude, and the center of gravity G of the trunk link 12, joints of the legs corresponding to knee joints of a human, and the joints corresponding to ankle joints of a human, are substantially aligned straight along the vertical line V, as viewed in the lateral direction of the robot. Note that in FIG. 1, the joints marked with reference numerals 28L and 28R correspond to the knee joints, and the joints marked with reference numerals 40L and 40R correspond to the ankle joints, as will be described hereafter. In other words, the "upright attitude" of the legged robot 10 is an attitude similar to the "upright posture" in the case of humans. The type of each joint is determined in a state where the legged robot 10 is maintaining the upright attitude. The directions in which the rotation axes of the joints provided in the legs extend may vary as a result of the links swinging. Nevertheless, no matter what attitude the legs 20L and 20R adopt, the types (names) of the joints determined in a state where the legged robot 10 is maintaining the upright attitude do not change. Also, when the legged robot 10 is maintaining the upright attitude, any joint in which the angle formed by the rotation axis thereof and the roll axis is the smallest among the angles formed by such rotation axis with the roll axis, the pitch axis and the yaw axis, respectively, is classified as a roll joint. Likewise, any joint in which the angle formed by the rotation axis thereof and the pitch axis is the smallest among the angles formed by such rotation axis with the roll axis, the pitch axis and the yaw axis, respectively, is classified as a pitch joint. Yaw joints are determined in the like manner. In other words, the "pitch joint" refers to a joint that connects links such that the line orthogonal to the plane formed by the connected links when rotating relative to each other extends in the lateral direction of the robot. Similarly, the "roll joint" refers to a joint that connects links such that the line orthogonal to the plane formed by the connected links when rotating relative to each other extends in the front-back direction of the trunk link. The "yaw joint" refers to a joint that connects links such that the line orthogonal to the plane formed by the connected links when rotating relative to each other extends in the up-down direction of the trunk link.

The structure of the left leg 20L of the legged robot 10 will now be described. The left leg 20L has a first left link 22L, a second left link 26L, a third left link 30L, a fourth left link 34L, a fifth left link 38L, and a sixth left link 42L. Also, the left leg 20L has a first left joint 24L, a second left joint 28L, a third left joint 32L, a fourth left joint 36L, and a fifth left joint 40L. A clutch 25L is equipped in the first left joint 24L.

The first left link 22L has one end fixed to the left side surface 12L of the trunk link 12 and the other end connected to the first left joint 24L. In other words, the first left link 22L forms a part of the trunk link 12. The second left link 26L has one end connected to the first left joint 24L and the other end connected to the second left joint 28L. The third left link 30L has one end connected to the second left joint 28L and the other end connected to the third left joint 32L. The fourth left link 34L has one end connected to the third left joint 32L and the other end connected to the fourth left joint 36L. The fifth left link 38L has one end connected to the fourth left joint 36L and the other end connected to the fifth left joint 40L. The sixth left link 42L has one end connected to the fifth left joint 40L. The sixth left link 42L is equivalent to the foot of the left leg 20L, and the bottom surface thereof is in contact with the floor S. Note that the first left joint 24L, the second left joint 28L and the fifth left joint 40L are pitch joints. The third left joint 32L is a yaw joint. The fourth left joint 36L is a roll joint.

The right leg 20R has a first right link 22R, a second right link 26R, a third right link 30R, a fourth right link 34R, a fifth right link 38R, and a sixth right link 42R. The right leg 20R further has a first right joint 24R, a second right joint 28R, a third right joint 32R, a fourth right joint 36R, and a fifth right joint 40R. A clutch 25R is equipped in the first right joint 24R. The right leg 20R is connected to the right side surface 12R of the trunk link 12 at one end of the first right link 22R. The structure of the right leg 20R is the same as that of the left leg 20L. However, viewed in the roll axis direction (X-axis direction), the overall shape of the right leg 20R is a mirror image of the overall shape of the left leg 20L, with respect to the line that passes through the center of the trunk link 12 and is parallel to the yaw axis.

Various parts of the right leg 20R corresponding to those of the left leg 20L are assigned the same number. The letter "L" in the reference numeral indicates that the part belongs to the left leg 20L, and the letter "R" in the reference numeral indicates that the part belongs to the right leg 20R. Since the structure of the right leg 20R is the same as that of the left leg 20L, a detailed description of the right leg 20R is omitted.

Each joint includes an actuator that is not shown in the drawings. The actuator is composed of a motor and a reducer. Each joint can rotate the links connected thereto in a manner that the links rotate relative to each other around the rotation axis by means of the actuator included therein. The legged robot 10 is equipped with a controller (not shown in the drawings) that sends appropriate drive command values to the actuators of the joints. By means of the controller sending appropriate drive command values to the actuators, the corresponding links swing cooperatively, and as the result thereof, the legged robot 10 walks. The description of the algorithms for making the legged robot 10 walk is omitted.

The line passing through the center of relative rotation of links connected to a joint is termed the "rotation axis" of the joint. Also, the cross point of the rotation axis with a plane formed by the links as they rotate relative to each other is termed the "rotation center". In the legged robot, the pitch joint, among the various joints in each leg, whose rotation center is located at the highest position is termed the "uppermost pitch joint". In the legged robot 10, the first left joint 24L is the uppermost pitch joint of the left leg 20L, and the first right joint 24R is the uppermost pitch joint of the right leg 20R. Also, the first left joint 24L, which is the uppermost pitch joint of the left leg 20L, is capable of rotating the links connected thereto (i.e. the first left link 22L and the second left link 26L) in a plane parallel to the XZ plane, and the rotation center thereof is the point 24LP shown in FIG. 1. Likewise, the first right joint 24R, which is the uppermost pitch joint of the right leg 20R, is capable of rotating the links connected thereto (i.e. the first right link 22R and the second right link 26R) in a plane parallel to the XZ plane, and the rotation center thereof is the point 24RP shown in FIG. 1.

In the legged robot 10, the rotation centers (24LP and 24RP) of the uppermost pitch joints (the first left joint 24L and the first right joint 24R) are both located above the center of gravity G of the trunk link 12. As FIG. 1(B) shows, in the legged robot 10, the rotation axis C1 of the uppermost pitch joints extends parallel to the pitch axis. Hence, viewed in the lateral direction of the robot, the rotation axis C1 coincides with the rotation centers 24LP and 24RP. Thus, with the legged robot 10, the rotation axis of the uppermost pitch joints may be expressed as being located above the trunk link 12 when viewed in the lateral direction of the robot.

Also, the rotation center 24LP of the first left joint 24L and the rotation center 24RP of the first right joint 24R are disposed so as to be aligned with the center of gravity G of the trunk link 12 along the vertical line V, as viewed in the lateral direction of the robot, when the legged robot 10 is maintaining the upright attitude.

In the legged robot which walks by alternately swinging each of its pair of legs, the greater the height from the floor to the rotation centers of the uppermost pitch joints, larger strides can be obtained. As FIG. 1(B) shows, the height from the floor S to the rotation centers 24LP and 24RP of the uppermost pitch joints when the legged robot 10 is maintaining the upright attitude is H2, while the height from the floor S to the bottom surface 12B of the trunk link 12 is H1. In the legged robot 10, the rotation centers of the uppermost pitch joints are located above the center of gravity G of the trunk link 12. Therefore, the legged robot 10 can obtain longer strides while keeping the trunk link 12 positioned lower than that in a legged robot in which the legs are connected at the bottom of the trunk link 12.

Figure 2:
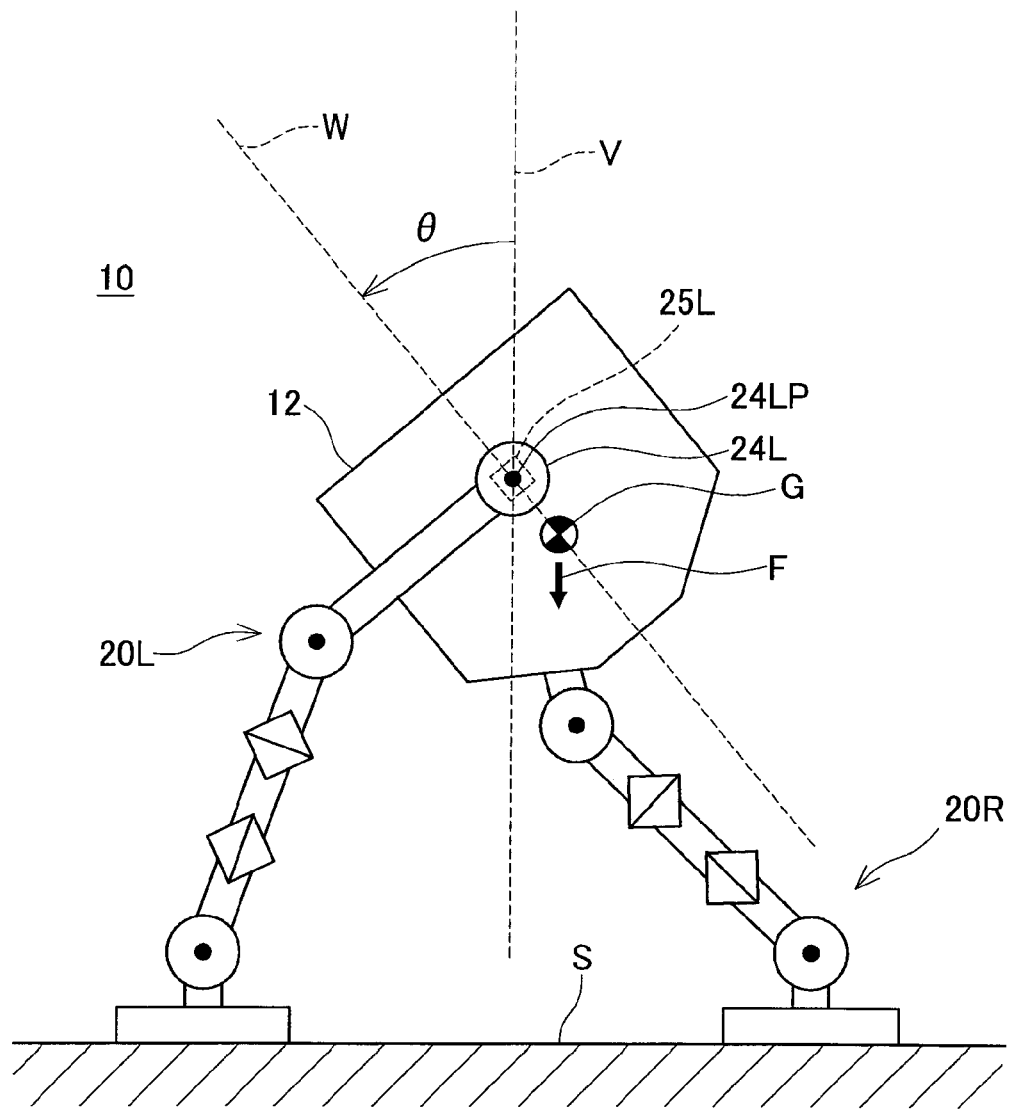
FIG. 2 is a side view of the legged robot at a certain moment during walking.

FIG. 2 is a side view of the legged robot 10 at a certain moment during walking. The legged robot 10 walks by alternately swinging the left and right legs 20L and 20R. The trunk link 12 wobbles due to reactive force from the legs, or due to control for maintaining overall balance of the legged robot 10.

During walking, the left and right legs 20L and 20R swing widely around the rotation centers 24LP, 24RP of the uppermost pitch joints (the first right joint 24R and the first left joint 24L). More precisely, the rotation of the first right joint 24R and the first left joint 24L are predominant in the swinging of the legs 20L, 20R during walking. Hence, the rotations of the first right joint 24R and the first left joint 24L are predominant in the wobbling of the trunk link 12 as well. In other words, wobbling of the trunk link 12 during walking is predominantly influenced by the movement of the uppermost pitch joints (the first right joint 24R and the first left joint 24L) around the rotation centers 24LP, 24RP. In FIG. 2, the symbol ? denotes the attitude angle of the trunk link 12 around the line extending in the lateral direction of the robot. A broken line W in FIG. 2 is a line connecting the rotation center 24LP and the center of gravity G, viewed in the lateral direction of the robot. As FIG. 1(B) shows, when the legged robot 10 is maintaining the upright attitude, the line W coincides with the vertical line V, viewed in the lateral direction of the robot. The angle ? between the vertical line V and the line W represents the attitude angle of the trunk link 12 with respect to the line extending in the lateral direction of the robot.

A gravitational force F acting on the trunk link 12 in FIG. 2, acts so as to swing back the center of gravity G of the trunk link 12 to vertically below the rotation center 24LP of the uppermost pitch joint, which is the rotation center of the wobbling. That is, the gravitational force acting on the trunk link 12 acts so as to return the trunk link 12 to the attitude assumed when the robot is in the upright attitude. This means that in the legged robot 10, the gravitational force acting on the trunk link 12 acts in a direction that suppresses the wobbling of the trunk link 12 during walking. This advantage can be achieved by locating the rotation centers 24LP, 24RP of the first left joint 24L and the first right joint 24R (the uppermost pitch joints of the legged robot 10) above the center of gravity G of the trunk link 12.

The first right joint 24R and the first left joint 24L include clutches 25R and 25L, respectively. When the clutch 25R is released, the first right link 22R and the second right link 26R, which are connected by the first right joint 24R, can freely rotate relative to each other. Likewise, when the clutch 25L is released, the first left link 22L and the second left link 26L, which are connected by the first left joint 24L, can freely rotate with respect to each other. Since the first right link 22R and the first left link 22L are connected to the trunk link 12, the trunk link 12 can rotate passively in response to the external force when the clutches are released.

Figure 3:
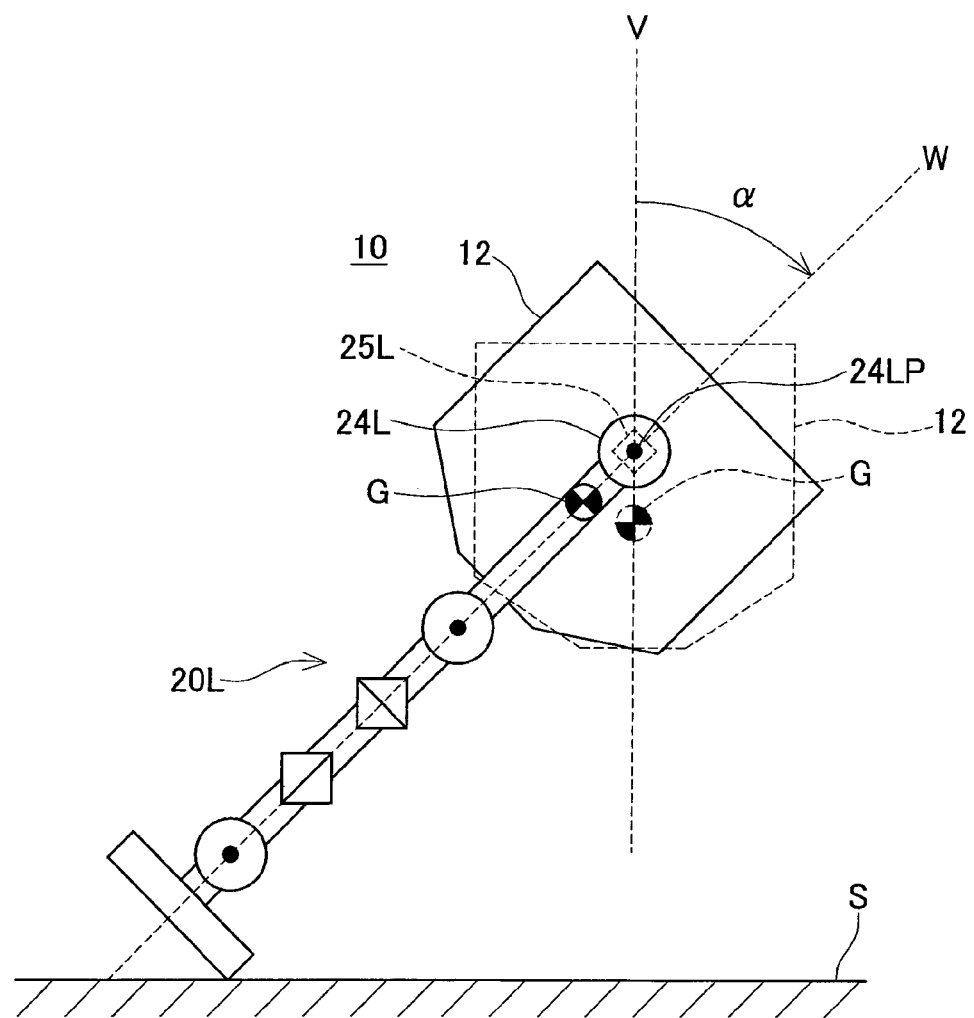
FIG. 3 is a side view of the legged robot at a certain moment when falling over.

FIG. 3 is a side view, depicted in solid lines, of the legged robot 10 at a moment when it is falling over. With the legged robot 10, the clutches 25L, 25R are released when an attitude angle a of the trunk link 12 with respect to the line extending in the lateral direction of the robot (that is, with respect to the rotation axis C1) exceeds a predetermined range. When the clutches are released, the trunk link 12 is allowed to rotate freely around the rotation centers 24LP and 24RP. Note that in FIG. 3, the rotation center 24RP is located behind the rotation center 24LP and therefore is not shown. Because the rotation centers 24LP and 24RP of the uppermost pitch joints are located above the center of gravity G of the trunk link 12, the gravitational force acts so as to swing the center of gravity G of the trunk link 12 back to vertically below the rotation centers 24LP and 24RP. Hence, even if the legged robot 10 falls over, the legged robot 10 can bring down the trunk link 12 to the floor S in a stable attitude as indicated by a broken line 12, by releasing the clutches 25L, 25R.

The legged robot 10 may be judged to be falling over when at least one of the followings exceeds a predetermined range: the attitude angle of the trunk link 12 with respect to the line extending in the lateral direction of the robot; the attitude angle rate; and the attitude angle acceleration. Alternatively, the legged robot 10 may be judged to be falling over when at least one of the speed of the trunk link and the acceleration of the trunk link exceeds a predetermined range.

Also, in the case where the power internally supplied for rotating the first right link 22R and second right link 26R relative to each other is transmitted via belts, a tension adjusting device that adjusts the tension of the belts may be employed instead of the clutch 25R. By loosening the tension to zero, the tension adjustment mechanism may cause the first right link 22R and the second right link 26R to passively rotate relative to each other (can allow the first right link 22R and the second right link 26R to rotate freely). The same applies to the case where the power for rotating the first left link 22L and the second left link 26L relative to each other is transmitted via belts.

Second Embodiment

Figure 4:
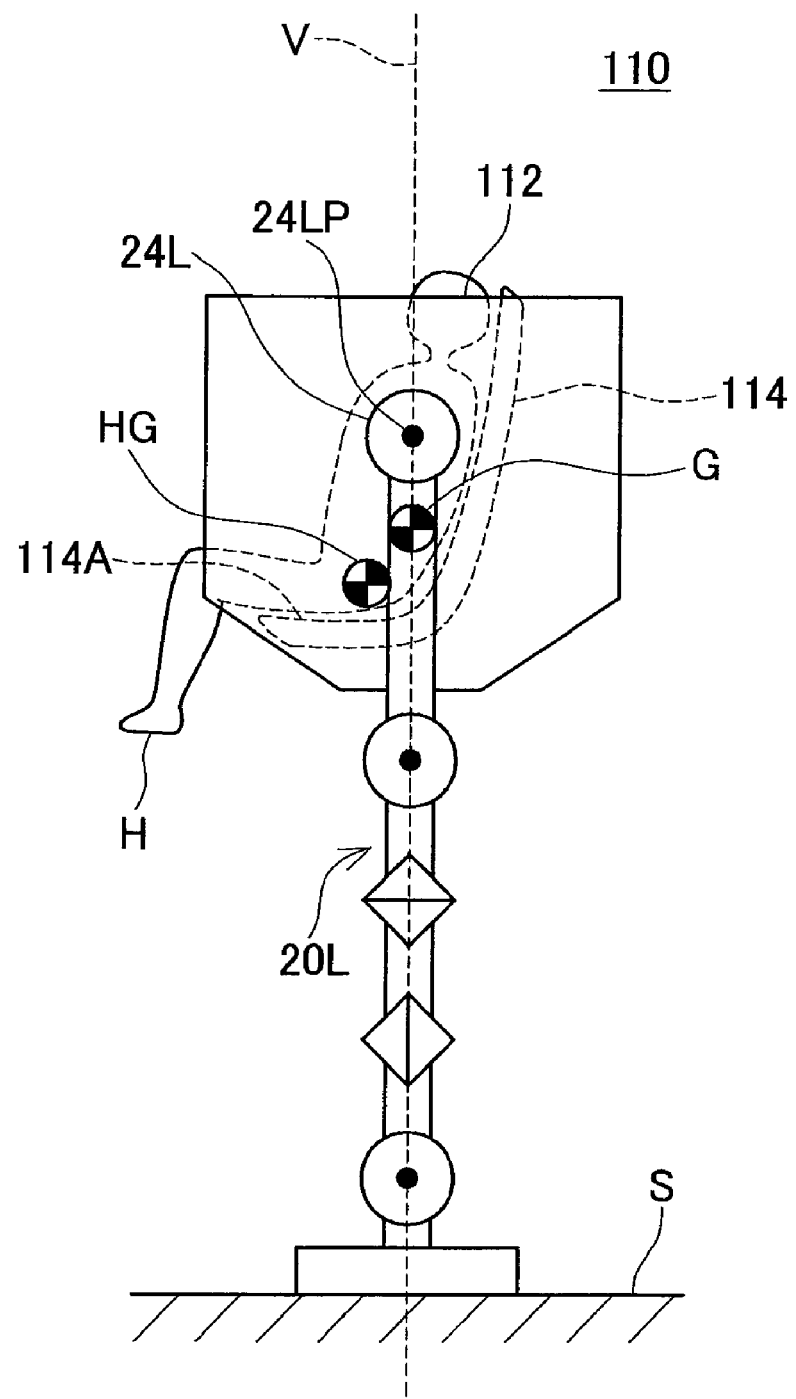
FIG. 4 is a side view of a legged robot according to a second embodiment.

A second embodiment of the present invention will now be described. FIG. 4 is a side view of a legged robot 110 according to the second embodiment. The legged robot 110 has, in the interior of the trunk link 112 thereof, a seat 114 on which a rider H sits. The external form of the trunk link 112 and the structure of the legs 20L and 20R in the legged robot 110 are the same as those in the legged robot 10 according to the first embodiment, and descriptions thereof are therefore omitted. Note that, in FIG. 4, the right leg 20R is located behind the left leg 20L and therefore is not shown.

In the legged robot 110, the rotation centers 24LP and 24RP of the first left joint 24L and the first right joint 24R, which are the uppermost pitch joints, are also located above the center of gravity G of the trunk link 112, as in the legged robot 10 according to the first embodiment. Note that the first right joint 24R and the rotation center 24RP thereof are not shown in FIG. 4. A seat surface 114A of the seat 14 provided in the interior of the trunk link 112 is disposed such that the waist of a rider seated therein is located below the rotation centers 24LP, 24RP.

It is known that in the ordinary seated attitude of a human, the center of gravity of the human is located near the waist. Hence, by disposing the seat 114 in the foregoing manner, the center of gravity HG of the seated rider H can be located below the rotation centers 24LP, 24RP of the uppermost pitch joints. Taken together with the fact that the center of gravity G of the trunk link 112 is also located below the rotation centers 24LP, 24RP of the uppermost pitch joints, this means that the combined center of gravity of the trunk link 112 and the rider H will be located below the rotation centers 24LP, 24RP of the uppermost pitch joints. Thus, in the legged robot 110, the trunk link 112 can be made stable when the rider is riding therein.

Note that the seat 114 is disposed such that the seat surface 114A is substantially orthogonal to the vertical line V connecting the rotation centers 24LP, 24RP of the uppermost pitch joints and the center of gravity G of the trunk link 112, viewed in the lateral direction of the robot. Since the trunk link 112 wobbles around the rotation centers 24LP, 24RP of the uppermost pitch joints, the gravitational force acting on the trunk link 112 acts so as to position the center of gravity G of the trunk link 112 vertically below the rotation centers 24LP, 24RP. Thus, a state in which the line connecting the rotation centers 24LP, 24RP of the uppermost pitch joints and the center of gravity G of the trunk link 12 coincides with the vertical line V, viewed in the lateral direction of the robot, constitutes the attitude in which the trunk link 112 is most stable. With the foregoing configuration, the surface 114A of the seat 114 can be kept substantially horizontal (in an orientation orthogonal to the vertical direction) when the trunk link 112 is in such attitude.

Third Embodiment

A third embodiment of the present invention will now be described with reference to the accompanying drawings. FIG.

5 shows three views (a top view, a side view and a rear view) of a legged robot 210 according to the third embodiment. FIG. 5(A) is a top view of the legged robot 210, FIG. 5(B) is a side view of the legged robot 210, and FIG. 5(C) is a rear view of the legged robot 210.

The legged robot 210 has a trunk link 212 and a pair of legs (a left leg 220L and a right leg 220R). The bottom surface 212a of the trunk link 212 is provided with sliding joints 216L and 216R that correspond to the legs 220L and 220R, respectively. The sliding joints 216L and 216R slidably connect respective one ends 224La and 224Ra of the legs 220L and 220R to the trunk link 212.

The structure of the left leg 220L will now be described. The left leg 220L has a plurality of links 221L, 222L, 224L, a plurality of rotary joints 230L, 232L, 234L, 236L, and a sliding joint 216L. The first left link 221L constitutes a floor-side end portion of the left leg 220L. Using the analogy of a human, the first left link 221L corresponds to a foot. The first left link 221L and the second left link 222L are connected by a first combined joint 226L. Using the analogy of a human, the second left link 222L corresponds to a lower leg, and the first left combined joint 226L corresponds to an ankle joint.

The first left combined joint 226L is composed of a first left roll joint 230L that swings the first left link 221L and second left link 222L relative to each other around a roll axis S1, and a first left pitch joint 232L that swings the first left link 221L and second left link 222L relative to each other around a pitch axis S2. Thus, by means of the first left combined joint 226L, the first left link 221L and second left link 222L can rotate relative to each other in two directions; i.e. around the roll axis S1 and around the pitch axis S2.

The second left link 222L and the third left link 224L are connected by a second left combined joint 228L. Using the analogy of a human, the third left link 224L corresponds to a thigh, and the second left combined joint 228L corresponds to a knee joint. The second combined joint 228L is composed of a second left roll joint 234L that rotates the second left link 222L and the third left link 224L relative to each other around a roll axis S3, and a second left pitch joint 236L that rotates the second left link 222L and the third left link 224L relative to each other around a pitch axis S4. Thus, by means of the second left combined joint 228L, the second left link 222L and the third left link 224L can rotate relative to each other in two directions; i.e. around the roll axis S3 and around the pitch axis S4.

Each of the joints 230L, 232L, 234L and 236L includes a motor (not shown in the drawings) and an encoder (also not shown in the drawings). The motors generate the torque for rotating the links adjoining the joints relative to each other. The encoders detect the relative rotation angle of the links adjoining the joints.

The structure of the right leg 220R is the same as that of the left leg 220L. For example, a first right link 221R of the right leg 220R corresponds to the first left link 221L of the left leg 220L. Similarly, the parts of the right leg 20R corresponding to those of the left leg 20L are assigned the same number. Correspondence between the pitch axes and roll axes of the left leg 220L and of the right leg 220R are as follows. The roll axes S1 and S3 of the left leg 220L correspond to roll axes S5 and S7 of the right leg 220R, respectively. The pitch axes S2 and S4 of the left leg 220L correspond to pitch axes S6 and S8 of the right leg 220R, respectively. Joints 230R, 232R, 234R and 236R of the right leg 220R also include a motor (not shown in the drawings) and an encoder (also not shown in the drawings). The motors generate the torque for rotating the links adjoining the joints relative to each other. The encoders detect the relative rotation angle of the links adjoining the joints.

The sliding joints (the left sliding joint 216L and the right sliding joint 216R) will be described below. The left sliding joint 216L slidably connects the left leg 220L to the trunk link 212. The left sliding joint 216L has a rail 240L, a sliding member 241L, and an actuator 242L. The bottom surface 212a of the trunk link 212 curves so as to protrude downward viewed in the lateral direction of the robot, and the rail 240L is attached along this curved bottom surface 212a. Thus, the rail 240L extends in the front-back direction of the trunk link 212 and also takes a curved form protruding in the downward direction of the trunk link 212. In other words, the rail 240L extends in the front-back direction of the trunk link 212 on the bottom surface 212a of the trunk link 212, and is formed so as to trace a curve. As FIG. 5(B) shows, such curve traces a curved line with a point P in the trunk link 212 as its center and with curvature radius R. That is, viewed in the lateral direction of the robot, the rail 240L is provided on the bottom surface of the trunk link 212 and traces an arc having its center at the fixed point P in the trunk link 212. The point P is located above the center of gravity G of the trunk link 212.

A sliding member 241L is attached on the rail 240L. The sliding member 241L slides (moves) on the rail 240L. One end 224La of the third left link 224L is fixed to the sliding member 241L. The third left link 224L corresponds to the top end link of the left leg 220L, and the end 224La of the third left link 224L corresponds to the top end of the entire left leg 220L. This means that when the sliding member 241L slides on the rail 240L, the entire left leg 220L fixed to the sliding member 241L moves along the rail 240L. Since the rail 240L is formed along the arc having the point P as its center viewed in the lateral direction of the robot, the left leg 220L as a whole swings so as to trace an arc with the point P as its center viewed in the lateral direction of the robot.

The actuator 242L outputs the drive power for sliding the sliding member 241L (i.e. the left leg 220L fixed to the sliding member 241L) along the rail 240L. The actuator 242L positions the left leg 220L at a desired position along the rail 240L. The left sliding joint 216L is equipped with a position sensor (not shown in the drawings), which detects the position of the sliding member 241L on the rail 240L.

A detailed description of the mechanism of the left sliding joint 216L is omitted, however, the mechanism may be realized by bending a linear-sliding mechanism that is used for a mono-axial stage.

The right sliding joint 216R slidably connects the right leg 220R to the trunk link 212. The structure of the right sliding joint 216R is the same as that of the left sliding joint 216L, and the description thereof is therefore omitted. Note that the rail 240R of the right sliding joint 216R also curves along an arc with the point P as its center and with the radius R, viewed in lateral direction of the robot. The center of the arc traced by the rail 240L of the left sliding joint 216L and the center of the arc traced by the rail 240R of the right sliding joint 216R coincide at the point P, as viewed in the lateral direction of the robot. That is, the centers of the curves of the pair of curved sliding joints 216L, 216R are aligned along a straight line extending in the lateral direction of the trunk link 212.

Besides the sliding joints 216L, 216R, the trunk link 212 is also provided with a controller (not shown in the drawings) that controls the legged robot as a whole.

Figure 5:
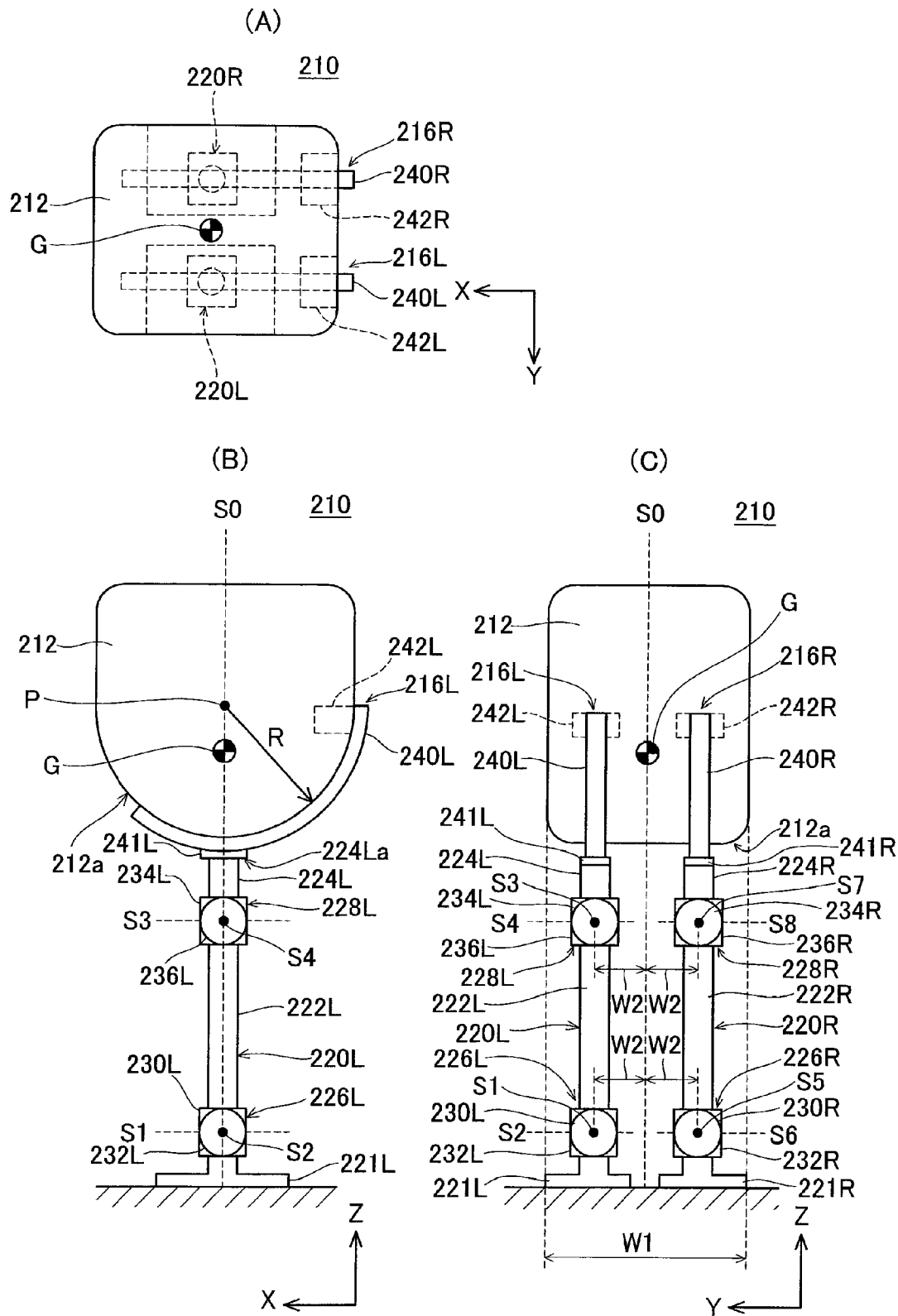
FIG. 5(A) is a top view of a legged robot according to a third embodiment.
FIG. 5(B) is a side view of the legged robot according to the third embodiment.
FIG. 5(C) is a rear view of the legged robot according to the third embodiment.

The other symbols appearing in FIG. 5 are as follows. Reference symbol G indicates the center of gravity of the trunk link 212, and reference symbol W1 indicates the width of the trunk link 212. The width W1 is equivalent to the length of the trunk link 212 in the lateral direction. Reference symbol S0 indicates the vertical line that passes through the center of gravity of the trunk link 212 and extends in the vertical direction. Reference symbol W2 indicates the distance in the lateral direction of the robot between the vertical line S0 and each of the rotation axes S1, S3, S5 and S7 of the respective roll joints 230L, 234L, 230R and 234R. The relations among the center of gravity Q the width W1 of the trunk link 212, and the distances W2 between the vertical line S0 and the roll axes, will be described hereafter. Note that the attitude shown in FIG. 5 corresponds to the upright attitude of the legged robot 210.

Figure 6:
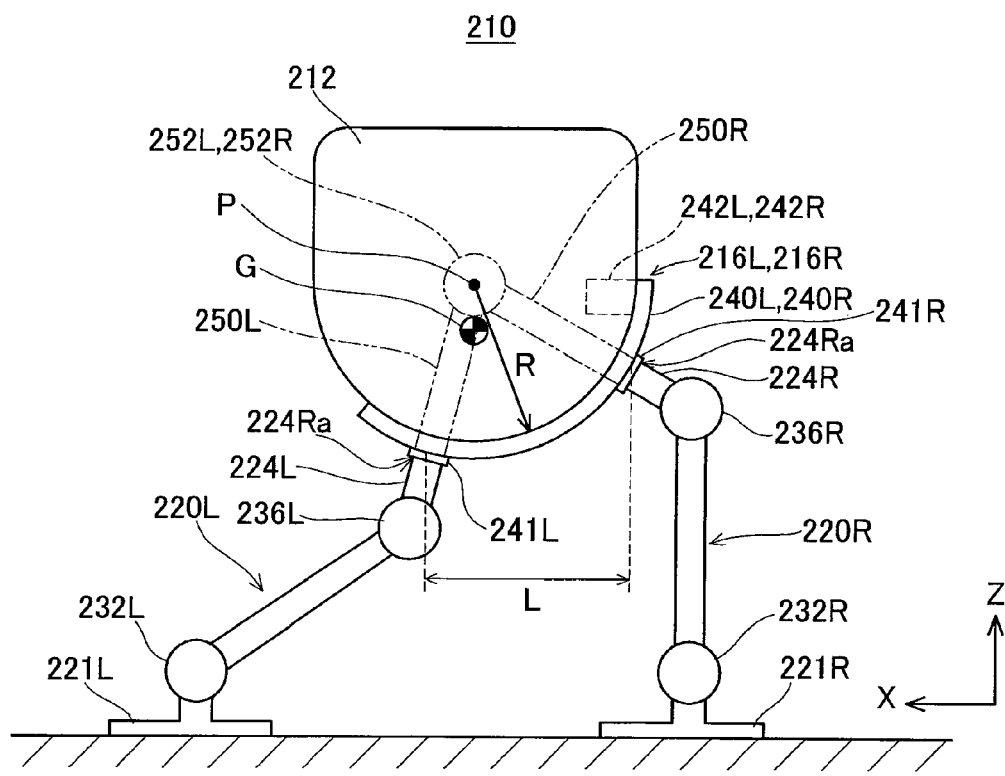
FIG. 6 is a side view of the legged robot according to the third embodiment at a certain moment during walking.

Next, the motion of the legged robot 210 during walking will be described, referring to FIGS. 5 and 6. FIG. 6 is a side view of the legged robot 210 with its left leg 220L stepping forward in the X-axis direction. Here, the "forward" corresponds to the positive direction of the X-axis in FIG. 6. FIG. 6 shows a situation where the legged robot 210 is moving forward in the positive direction of the X-axis. The description below focuses on the movements of the left leg 220L and right leg 220R in the XZ plane while the robot is moving forward, assuming that the roll joints 230L, 234L, 230R and 240R of the legs 220L and 220R do not rotate while the robot is moving forward. Accordingly, the first and second roll joints 230L and 234L inside the first and second combined joints 226L and 228L of the left leg 220L are omitted from FIG. 6. Likewise, the first and second roll joints 230R and 234R inside the first and second combined joints 226R and 228R of the right leg 220R are also omitted.

Each of the joints 232L, 236L, 232R, and 236R of the legs 220L and 220R includes an actuator (not shown in the drawings) for rotating the adjoining links. The left sliding joint 216L is equipped with an actuator 242L that slides the sliding member 241L (i.e. the end 224La of the left leg 220L fixed to the sliding member) to any desired position along the rail 240L. The right sliding joint 216R is likewise equipped with an actuator 242R.

The position of the left leg 220L on the rail 240L is detected by a position sensor (not shown in the drawings) with which the left sliding joint 216L is equipped. Likewise, the position of the right leg 220R on the rail 240R is detected by a position sensor (not shown in the drawings) with which the right sliding joint 216R is equipped. The other joints of the legs 220L, 220R are equipped with encoders (not shown in the drawings). The relative rotation angles of the links detected by the encoders and the positions of the legs 220L, 220R detected by the position sensors are input to the controller (not shown in the drawings) that is mounted in the legged robot 210. Based on the inputted values, and according to a predetermined control logic, the controller outputs to the various actuators command values for appropriately controlling the various joints. As a result, the legged robot 210 walks by alternately swinging each leg 220L, 220R backward and forward.

As FIG. 6 shows, when the legged robot 210 steps out with the left leg 220L forward, the end 224La (the sliding member 241L) of the left leg 220L is made to slide along the rail 240L to the front of the trunk link 212. Simultaneously, the end 224Ra (the sliding member 241R) of the right leg 220R is made to slide along the rail 240R to the rear of the trunk link 212. As a result, the end 224La of the left leg 220L and the end 224Ra of the right leg 220R space apart by the distance L in the front-back direction of the trunk link 212.

In the legged robot in which a pair of legs is connected to the trunk link via rotary joints, like the hip joints of a human, the connecting parts for the legs and trunk link (the joints connecting the trunk link to the legs) cannot be displaced in the front-back direction. Hence, in such a conventional legged robot, the strides during walking are greatly dependent on the overall length of the legs, from the parts connecting the legs and trunk link down to the feet. By contrast, with the legged robot 210, it is possible to have the end 224La of the left leg 220L and the end 224Ra of the right leg 220R spaced apart by the distance L in the front-back direction of the trunk link 212. As a result, the strides determined by the overall length of the legs 220L, 220R can be made longer by an additional amount equal to the distance L. The distance L denotes the distance in the front-back direction between the ends 224La and 224Ra of the pair of legs 220L and 220R connected to the trunk link 212. Thus, with the legged robot 210, the strides during walking can be made larger without increasing the overall length of the legs, by connecting the pair of legs 220L, 220R to the trunk link 212 via a pair of sliding links 216L, 216R that allow each leg to slide in the front-back direction with respect to the trunk link 212. In other words, with the legged robot 210, a large stride can be obtained while keeping the height of the trunk link 212 low.

Also, the rail 240L of the left sliding joint 216L curves with curvature radius R having as its center the fixed point P in the trunk link 212. Note that the fixed point P is located above the rail 240L. In other words, the rail 240L curves so as to protrude in the downward direction of the trunk link 212. Hence, the end 224La of the left leg 220L fixed to the sliding member 241L can move along the curve of the rail 240L. Due to the fact that the end 224La of the left leg 220L moves in the front-back direction tracing the curve that protrudes in the downward direction of the trunk link 212, it is possible to make the motion of the left leg 220L during walking smooth. The same applies to the right leg 220R.

With the legged robot 220, the rail 240L is formed in an arc shape having as its center a unique fixed point P in the trunk link 212, and the arc that the rail 240L defines extends in the front-back direction of the trunk link 212. Hence, the geometric relation of the structure of connection between the left leg 220L and the trunk link 212 via the left sliding joint 216L is equivalent to the following structure. Suppose an imaginary rotary joint 252L with a rotation axis that passes through the point P in the trunk link 212 and extends in the pitch direction (Y-axis direction). The imaginary rotary joint 252L and the second left pitch joint 236L are connected by an imaginary link 250L that is an extension of the third left link 224L in the direction of the point P.

The structure in the legged robot 210 is equivalent to the structure in which the imaginary rotary joint 252L disposed at the point P connects the left leg 220L having the imaginary link 250L to the trunk link 212. Thus, the legged robot 210 can realize walking equivalent to that of a legged robot in which the left leg 220L is connected not at the bottom of the trunk link 212 but via a rotary joint 252L having a rotation axis that passes through the point P viewed in the lateral direction of the trunk link 212. In other words, the legged robot 210 is able to realize a stride of the same size as the stride that would be realized by a leg having an imaginary link 250L connected to the trunk link 212 by an imaginary hip joint 252L disposed at the point P.

It is quite unrealistic to create a legged robot in which a physical joint is disposed at the position of the fixed point P in the trunk link 212. As FIG. 5(C) shows, the left leg 220L is connected to the trunk link 212 by the left sliding joint 216L underneath the bottom surface 212a of the trunk link 212. If one wishes to create the imaginary joint 252L having a rotation axis at the point P, the joint would have to be disposed in the interior of the trunk link 212. Further, it would be necessary to provide a space for the imaginary link 250L to swing underneath such joint. However, such configuration would practically deprive the room for placing other devices under the fixed point P in the trunk link 212. Configuration of such legged robot would be the same as were the bottom portion of the trunk actually in the position of the point P. That is, with a conventional legged robot, if one wishes to dispose a hip joint in the position of the point P, there would be no choice but to raise the height of the trunk.

By contrast, with the legged robot 210 according to the present embodiment, the real left leg 220L is connected to the trunk link 212 by the left sliding joint 216L at the bottom surface 212a of the trunk link 212. With the legged robot 210, there is no need to extend the left leg 220L into the interior of the trunk link 212. That is, with the legged robot 210, the strides can be made large without raising the position of the trunk link 212.

Further, as FIG. 5(C) shows, with the legged robot 210 according to the present embodiment, the left leg 220L is connected to the trunk link 212 via the left sliding joint 216L at the bottom surface 212a of the trunk link 212. Due to this, the distance W2, in the lateral direction of the robot, between the vertical line S0 passing through the center of gravity G of the trunk link 212 and each of the roll axes S1 and S3 of the roll joints 230L and 234L in the left leg 220L can be made short. Making the distance W2 short yields the following advantages.

Generally speaking, when a biped robot stands on one foot, that is, only one leg is in contact with the floor, the robot must support the trunk link using the leg which is in contact with the floor. In the case where only one leg is in contact with the floor, moment acts on the roll joints of the leg due to the self-weight of the trunk link. The size of the moment is proportional to the distance between the vertical line passing through the center of gravity of the trunk link, and the rotation axes of the roll joints. With the legged robot 210 according to the present embodiment, the left leg 220L is connected to the trunk link 212 at the bottom surface 212a of the trunk link 212. Hence, as FIG. 5(C) shows, when the legged robot 210 is in the upright attitude, it is possible to dispose the roll joints 230L and 234L of the left leg 220L within the width W1 of the trunk link 212 in the lateral direction. Accordingly, the lateral direction distance W2 between the vertical line S0 passing through the center of gravity G of the trunk link 212 and each of the rotation axes S1 and S3 of the roll joints 230L, 234L can be made short. As a result, with the legged robot 210 according to the present embodiment, the moment caused by the self-weight of the trunk link 212 that acts on the roll joints 230L and 234L of the leg which is in contact with the floor when the robot 210 is standing on one foot can be kept small. By providing a pair of sliding joints 216L and 216R at the bottom surface 212a of the trunk link 212, the moment applied to the roll joints of the leg that is in contact with the floor when the robot is standing on one foot can be made small. Consequently, low-output motors can be used for the roll joints in the legged robot 210.

Furthermore, the legged robot 210 has the structure in which the left leg 220L and the trunk link 212 are connected by a sliding joint 216L as described above. However, the structure is geometrically equivalent to a structure in which the left leg 220L has the imaginary link 250L and is connected to the trunk link 212 via the imaginary rotary joint 252L disposed at the fixed point P in the trunk link 212. In general, the calculations for transforming the angles of the joints of the multi-link mechanism into the distal position coordinates thereof and for the case of transforming the distal position coordinates of the multi-link mechanism into the angles of the joints thereof are simpler for the multi-link mechanism whose joints are all rotary joints than for the multi-link mechanism that includes sliding joints as a part of the constituents. In the technical field of robotics, the transform of the distal position coordinates of the multi-link mechanism from the angles of the joints thereof is called a positive transform, forward transform or forward kinematics, while the transform of the angles of the joints of the multi-link mechanism from the tip position coordinates thereof is called an inverse transform or inverse kinematics. Particularly, in the case in which the robot has a joint in which one of the links connected thereto moves on a rail in a curved manner, as in the sliding joints of the legged robot 210, both the positive transform and inverse transform are complicated. With the legged robot 210, it is necessary to implement positive transform or inverse transform among the foot end coordinates, the position of the end 224La of the left leg 220L at the left sliding joint 216L, and the rotation angles of the rotary joints. In the case of the legged robot 210, such positive transform or inverse transform can be implemented assuming that the trunk link 212 and left leg 220L are connected via a rotary joint, by substituting an imaginary rotary joint 252L assumingly disposed at the position of the point P and an imaginary link 250L for the left sliding joint 216L. From the results of such positive transforms or inverse transforms, it is possible to derive the position of the end 224La of the left leg 220L on the left sliding joint 216L. Thus, despite employing the left sliding joint 216L, the geometrical structure of the legs of the legged robot 210 simplifies the positive transform and inverse transform.

In the legged robot 210, the left sliding joint 216L allows the left leg 220L and the trunk link 212 to rotate relative to each other, with the point P as the center, in a plane parallel to the XZ plane of the XYZ coordinate system, as FIG. 5 shows. In other words, the left sliding joint 216L is a pitch joint and its rotation center is the point P. Also, the point P, which is the rotation center of the left sliding joint 216L, is located above the rotation axes S2 and S4 of the other pitch joints (the first left pitch joint 232L and the second left pitch joint 236L). That is, the left sliding joint 216L is equivalent to the uppermost pitch joint. Furthermore, the point P, which is the rotation center of the uppermost pitch joint, satisfies the relation of being located above the center of gravity G of the trunk link 212.

As described above, in the legged robot that walks by swinging a pair of legs backward and forward, the motion of the trunk link during walking consists mainly of wobbling around the rotation center of the uppermost pitch joints. Hence, the gravitational force acting on the trunk link 212 acts in a direction to move the center of gravity G of the trunk link 212 to below the point P, which is the rotation center of the uppermost pitch joints. That is, the gravitational force acts in a direction that suppresses wobble of the trunk link 212 in the front-back direction during walking. With the legged robot 210, the degree of wobbling in the front-back direction of the trunk link 212 during walking is small.

Above, specific embodiments of the invention have been described, but these are given merely by way of examples and do not limit the scope of the claims. The technology set forth in the claims includes many and various modifications and variants of the specific embodiments given by way of example above.

In the legged robot 10 according to the first embodiment, the joints that connect the trunk link 12 to the legs 20R and 20L are the uppermost pitch joints. And in the legged robot 210 according to the third embodiment, the sliding joints 216R and 216L that connect the trunk link 212 to the legs 220R and 220L are the uppermost pitch joints. In terming the joints that connect the top end links of the legs to the trunk link the "hip joints", one can say that in the legged robot 10 according to the first embodiment and the legged robot 210 according to the third embodiment, the uppermost pitch joints, which have rotation centers located above the center of gravity of the trunk link, are the hip joints. The uppermost pitch joints may not necessarily be the hip joints connecting the trunk link to the legs. Even if the joints connecting the trunk link to the legs are roll joints (or yaw joints) and some other of the joints of the legs are the uppermost pitch joints, the same advantageous effects as in the legged robots according to the embodiments can be obtained, provided that the rotation centers of the uppermost pitch joints are located above the center of gravity of the trunk link. Also, each leg may include two or more pitch joints having rotation centers above the center of gravity of the trunk link.

According to the third embodiment, the combined joint 226L (226R) combining the roll joint 230L (230R) with the pitch joint 232L (232R) is used in the left leg 220L (in the right leg 220R), as FIG. 5 shows. Instead of using the combined joint 226L (226R), the roll joint 230L (230R) and the pitch joint 232L (232R) may be connected in series by means of an additional link. The same applies to the other combined joint 228L (228R).

Also, according to the third embodiment, the sliding joints 216L and 216R are attached to the bottom surface of the trunk link 212. However, this pair of sliding joints 216L, 216R may be attached such that the respective sliding joint is on each of the two side surfaces of the trunk link 212. Such structure also suppresses the wobbling of the trunk link in the front-back direction during walking. Also, with the legged robot having such structure, a large stride can be secured with the position of the trunk link being kept low.

The technical elements set forth herein and in the drawings provide technical utility either singly or in various combinations, and are not limited to the combinations set forth in the claims of the application originally filed. Also, the technology set forth by way of example herein and in the drawings simultaneously achieves a plurality of objects, the achievement of any one of which has technical utility in itself.

What is claimed is:

1. A legged robot comprising:
   a trunk link; and
   a pair of legs, each of which is connected to the trunk link and has a plurality of links and joints, wherein:
   each joint connects at least two links and rotates the connected links relative to each other by power;
   at least one joint of each leg rotates the connected links in a plane crossing a line that extends in a lateral direction of the robot, and has a rotation center located above a center of gravity of the trunk link; and
   at least one joint of each leg that has the rotation center located above the center of gravity of the trunk link comprises a release mechanism that allows free rotation of the connected links when a predetermined condition is satisfied.

2. The legged robot according to claim 1, wherein one of the joints of each leg having the rotation center located above the center of gravity of the trunk link is a hip joint that connects an uppermost link of the leg to the trunk link.

3. The legged robot according to claim 2, wherein the hip joint comprises:
   a rail that is fixed to the trunk link and extends along an arc, wherein a center of the arc is at a point located above the center of gravity of the trunk link when viewed in the lateral direction of the robot; and
   a sliding member that slides on the rail and is fixed to the uppermost link of the leg.

4. The legged robot according to claim 1, wherein the predetermined condition is that at least one of the followings exceeds a predetermined range: an attitude angle of the trunk link with respect to a line extending in the lateral direction of the robot; a rate of the attitude angle; and an acceleration of the attitude angle.

5. The legged robot according to claim 1, wherein the predetermined condition is that at least one of a speed of the trunk link and an acceleration of the trunk link exceeds a predetermined range.

6. The legged robot according to claim 1, wherein the trunk link has a seat on which a rider sits, the seat being disposed so as to position a hip of the rider sitting thereon below the rotation center.

* * * * *